United States Patent [19]
Rusnack

[11] Patent Number: 6,122,481
[45] Date of Patent: Sep. 19, 2000

[54] IMAGE REPRODUCTION DEVICE FLEXIBLE COVER FOR IMAGE CAPTURE OF THREE-DIMENSIONAL OBJECTS

[75] Inventor: Michael R. Rusnack, Boise, Id.

[73] Assignee: Hewlett-Packard Company, Palo Alto, Calif.

[21] Appl. No.: 09/442,856

[22] Filed: Nov. 18, 1999

[51] Int. Cl.$^7$ .............................. G03G 15/00; H04N 1/04
[52] U.S. Cl. ........................................... 399/380; 358/474
[58] Field of Search ..................................... 358/474, 478; 396/5, 14; 399/377, 380; 430/22, 31, 8

[56] References Cited

U.S. PATENT DOCUMENTS

| 4,575,215 | 3/1986 | Ariyama et al. ......................... 399/380 |
| 5,450,173 | 9/1995 | Bekanich . | |
| 5,898,508 | 4/1999 | Bekanich ................................ 358/474 |

Primary Examiner—Arthur T. Grimley
Assistant Examiner—Hoang Ngo

[57] ABSTRACT

A reproduction device includes a reproduction unit and a generally flexible cover. The generally flexible cover enables high quality image capture of three-dimensional objects. In particular, when placed over a three-dimensional object that is supported on the reproduction unit, the generally flexible cover insures that light directed onto the object from the reproduction unit is reflected onto the object and/or back to the reproduction unit. Light reflected back to the object illuminates the edges of the object to improve image capture of the object while light reflected back to the reproduction unit conserves media marking fluid and/or yields a neutral background for the image. The flexible cover has a very low profile, being generally flat prior to covering an object. In addition, the flexibility of the cover allows the cover to drape over and/or conform about the object so that the reflective surface of the cover hangs close to, or contacts, the reproduction surface. This close spacing between the cover, object, and reproduction surface insures illumination of the object and minimal light loss to the atmosphere without a duplicate light source.

20 Claims, 3 Drawing Sheets

IMAGE REPRODUCTION DEVICE FLEXIBLE COVER FOR IMAGE CAPTURE OF THREE-DIMENSIONAL OBJECTS

FIELD OF THE INVENTION

This invention relates generally to image reproduction devices. In particular, the present invention includes a flexible cover for an image reproduction device to improve image capture of three-dimensional objects.

BACKGROUND OF THE INVENTION

Reproduction of two-dimensional objects and two-dimensional images is readily accomplished with conventional reproduction devices, such as copiers and scanners. However, reproducing an image of a three-dimensional object with these devices is more challenging since the task requires capturing a three-dimensional object into a two-dimensional image.

A common approach in the prior art for capturing an image of three-dimensional object uses a conventional copier or flat bed scanner. For example, conventional reproduction device 10 (e.g., copier or scanner) is shown generally in FIG. 1. Device 10 includes base reproduction unit 12, reproduction surface 14, generally rigid cover 16 with edges 17A, 17B, 17C, 17D, and three-dimensional object 18. In this arrangement, object 18 is placed on reproduction surface 14 and cover 16 is rotated about edge 17A toward object 18 as far as possible to cover object 18. However, as shown in FIG. 1, when cover 16 contacts object 18, edges 17B, 17C, and 17D, remain far from reproduction surface 14, never reaching that surface.

FIG. 2 further illustrates this arrangement. As shown in the sectional view of FIG. 2, base unit 12 further includes illumination source 20 with image reader 21 while cover 16 further includes reflective surface 24. Lines 22 represent a vertical plane generally aligned with edges 25 of object 18.

As light is emitted from illumination source 20, light 28 is reflected onto object 18 directly or indirectly from reflective surface 24 of cover 16. However, a large proportion of light 29 from illumination source 20 completely misses object 18 as the light passes by object 18. Moreover, since large portions of cover 16 do not extend across the path of light 29, or are not sealed at their edges 17B, 17C, 17D, light that misses object 18 is not reflected back to object 18 or back to reproduction unit 12. Finally, even some of the light that reaches reflective surface 24 of cover 16 is reflected outwardly away from reproduction surface 14 and image reader 21.

Nonreflected light 29 never returns to reproduction unit 12. In a scanner or a copier, this lost light produces an undesirably dark background to the reproduced image of the object. Moreover, because of the lost light, the reproduced image will have poor resolution at edges 25 of object 18, creating a blurred or fuzzy appearance. Finally, in a copy machine, this lost light wastes a large amount of media marking fluid because the copy machine attempts to reproduce the dark area with marking fluid. Typically, this media marking fluid can take the form of ink or toner. In flat bed-type scanner, this dark background requires a larger amount of data to be stored digitally to represent the three-dimensional object, thereby unnecessarily wasting storage space.

While not directly related to the quality of the image reproduced, a partially open cover produces an annoying flash to the user as the reproduction unit illuminates the three-dimensional object. Of course, this situation presents unfavorable working conditions, particularly where a high volume of three-dimensional objects will be scanned or copied.

Other prior art attempts to optimize image capture of three-dimensional objects with a scanner or copier include bulky box-type devices that rest on top of a copier or scanner. See for example, U.S. Pat. Nos. 5,898,508 and 5,450,173. These devices also include a duplicate light source and are generally rigid, constraining their use to a more limited number of shapes and sizes of three-dimensional objects to be scanned. Moreover, their bulky nature takes up a large amount of space and requires extra handling.

SUMMARY OF THE INVENTION

A reproduction device of the present invention includes a reproduction unit and a generally flexible cover. The generally flexible cover enables high quality image capture of three-dimensional objects. In particular, when placed over a three-dimensional object that is supported on the reproduction unit, the generally flexible cover insures that light directed onto the object from the reproduction unit is reflected onto the object and/or back to the reproduction unit. Light reflected back to the object illuminates the edges of the object to improve image capture of the object while light reflected back to the reproduction unit conserves media marking fluid and/or yields a neutral background for the image.

The flexible cover has a very low profile, being generally flat prior to covering an object. In addition, the flexibility of the cover allows the cover to drape over and/or conform about the object so that the reflective surface of the cover hangs close to the reproduction surface. This close spacing between the cover, object, and reproduction surface insures illumination of the object, without a duplicate light source, and results in minimal light loss to the atmosphere.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as the same become better understood by reference to the following detailed description when considered in connection with the accompanying drawings, in which like reference numerals designate like parts throughout the figures thereof, and wherein:

FIG. 5b is a greatly enlarged sectional view of a portion of the flexible cover shown in FIG. 5a.

DETAILED DESCRIPTION OF THE INVENTION

Figure 1:
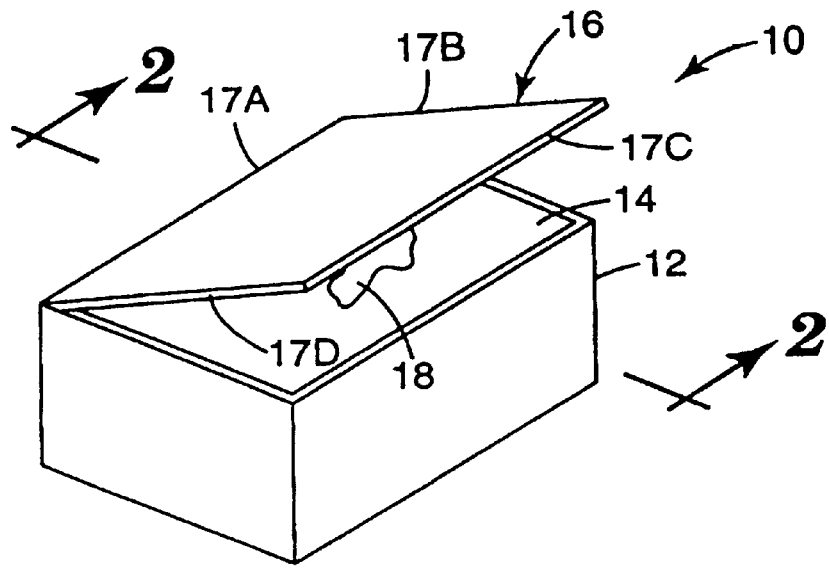
FIG. 1 is a perspective view of a prior art reproduction device.
Figure 2:
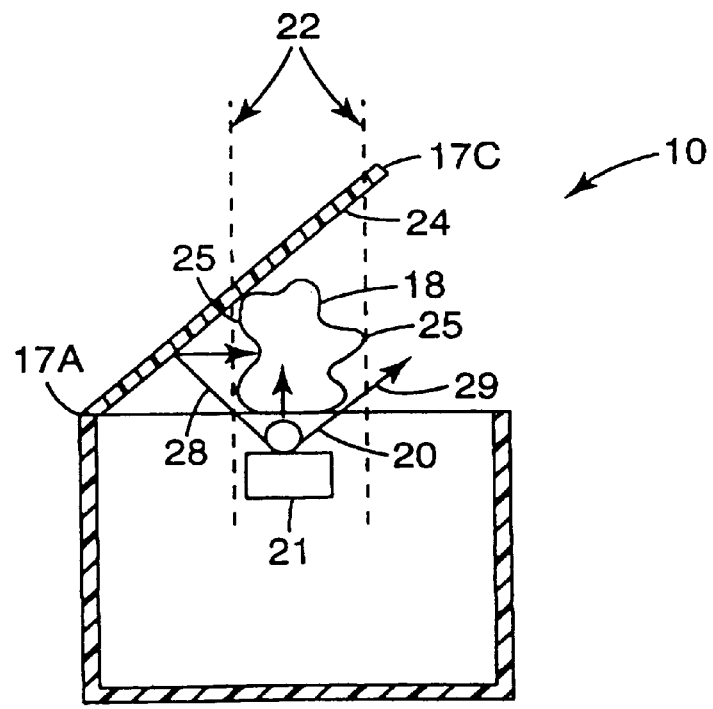
FIG. 2 is a sectional view of the prior art reproduction device of FIG. 1.
Figure 3:
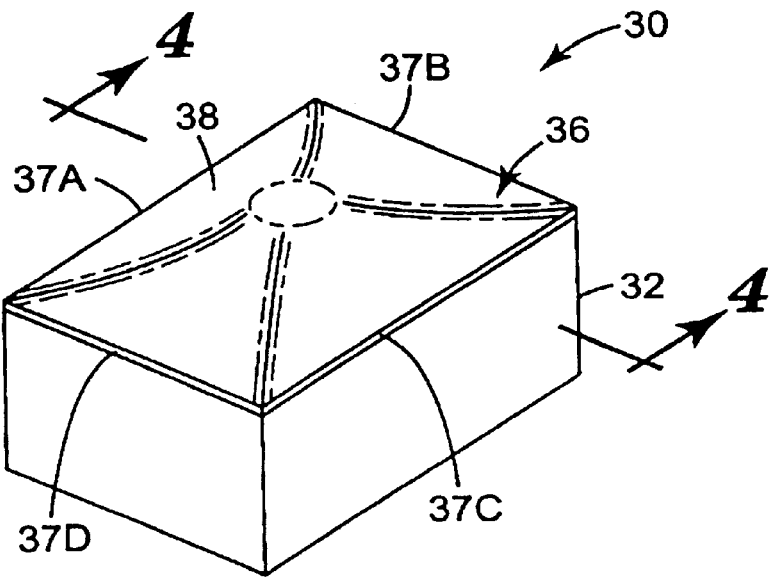
FIG. 3 is a perspective view of a reproduction device that includes a flexible cover in accordance with an embodiment the present invention.

Reproduction device 30 of the present invention is generally illustrated in FIG. 3. Reproduction device 30 includes base reproduction unit 32, reproduction surface 34 (FIG. 4), and generally flexible cover 36 with edges 37A, 37B, 37C, and 37D. Reproduction device 30 generally includes the same features and attributes as reproduction device 10, shown in FIGS. 1–2, except that reproduction device 30 includes generally flexible cover 36 instead of generally rigid cover 16.

Figure 4:
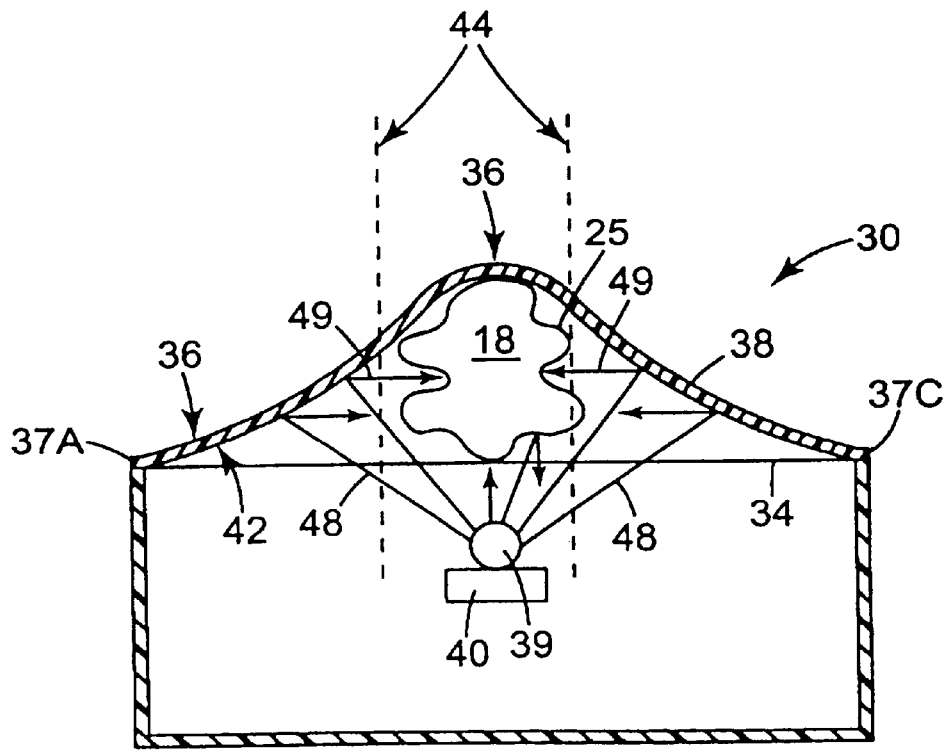
FIG. 4 is a sectional view of the reproduction device and flexible cover of FIG. 3.

As shown in the sectional view of FIG. 4, base unit 32 further includes reproduction surface 34 and illumination source 39 with image reader 40. Cover 36 further includes top surface 38 and reflective surface 42. Lines 44 represent the edges of an imaginary cylinder that is generally aligned with edges 25 of object 18.

Image reader 40 either can comprise conventional copier machine technology or scanner technology, or a combination of the two, as known to those skilled in the art. Image reader 40 works in conjunction with illumination source 39, which illuminates object 18 during image capture by image reader 40.

In use, illumination source 39 is activated and operates while image reader 40 reads an image of object 18. For example, direct light 48 is emitted from illumination source 39 onto object 18 and onto reflective surface 42 of cover 36. Light 49 is reflected from reflective surface 42 of cover 36 back to object 18, particularly back to edges 25 of object 18. In particular, reflected light 49 illuminates edges 25 of object 18 so that the corresponding edges in the reproduced image of object 18 have high resolution, i.e., they are not blurry or indefinite. Moreover, reflected light 49 allows more of the various surfaces of three-dimensional object 18 to be captured into a two-dimensional image. Since edges 37A–37D generally seal cover 36 to reproduction surface 34, virtually all of the light from illumination source 39 is on object 18 or is returned to reproduction unit 32. Finally, the reflected light 49 which is returned to reproduction unit 32 from cover 36 produces a neutral background for the reproduced image instead of black or dark background as often happens with conventional generally rigid covers which remain partially open when covering a three-dimensional object.

Generally flexible cover 36 has a very low profile, being generally flat when not covering an object. In addition, the flexibility of cover 36 allows cover 36 to drape over object 18 so that reflective surface 42 of cover 36 hangs close to reproduction surface 34. This close spacing between cover 36, object 18, and reproduction surface 34 insures illumination of object 18 for optimal image capture and insures minimal light loss to the atmosphere, thereby obviating any need for a duplicate light source. Cover 36 preferably is sized appreciably larger than the surface area of reproduction surface 34 to insure that cover 36 completely covers the three-dimensional object, which can be relatively high relative to reproduction surface 34.

Image reader 40 is optionally constructed to be particularly sensitive to certain colors or wavelengths of light. Accordingly, to accentuate capturing an image of three-dimensional objects, image reader 40 and/or reflective surface 42 of cover is adapted to produce or reflect, respectively, selected wavelengths of light.

Figure 5A:
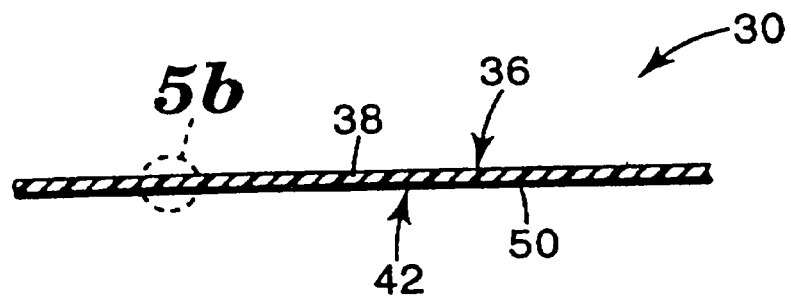
FIG. 5a is a partial sectional view of the flexible cover of the reproduction device in accordance with the present invention.
Figure 5B:
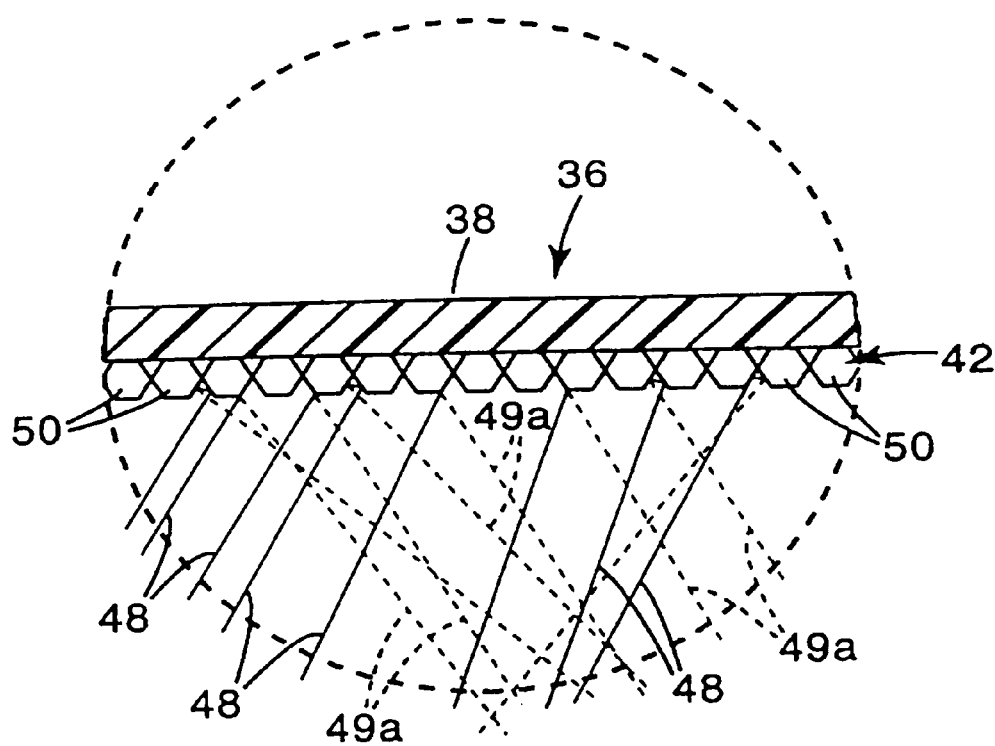

Reflective surface 42 of cover 36 is preferably constructed of a highly reflective or glossy material, as known to those skilled in the art. As seen best in FIGS. 5a and 5b, in one embodiment, the reflective surface 42 may comprise a reflective, textured coating 50 that would receive the direct light 48 (shown as solid lines in FIG. 5b for clarity), emitted from illumination source 39, and reflect this light as a random pattern of reflected light 49a (shown as dashed lines in FIG. 5b for clarity). The reflected light 49a assumes this random pattern due to the textured nature of the reflective coating 50. The textured nature of the reflective coating 50 also causes the reflective surface 42 to brighten (i.e., light up) when illuminated by the direct light 48 from the illumination source 39. The randomness of the reflected light 49a and the brightening of the reflective surface 42 better illuminates the edges 25 of object 18 so that the corresponding edges in the reproduced image of object 18 have high resolution, i.e., they are not blurry or indefinite. As such, more of the various surfaces of three-dimensional object 18 will be captured into the two-dimensional image.

Cover 36 is preferably constructed of a generally flexible, resilient material capable of generally conforming to the shape of an object on which cover 36 rests. For example, as shown in FIG. 3, this resilient conformability allows top surface 38 of cover 36 to drape over object 18, thereby maximizing the amount of light contained under cover 36 and directed back to the object 18. In particular, the ability of portions of reflective surface 42 of cover 36 to hang close to edges 25 of object 18 reduces the amount of travel of light reflected by cover 36 to object 18 and maximizes the amount of reflective surface 42 which is at an angle or position suitable for reflecting light to edges 25 of object 18. A generally rigid cover structure, such as that found in the prior art, would maintain a larger distance between the reflective surface of such a cover and the object to be illuminated.

While cover 36 is shown attached to reproduction unit 32, cover 36 need not be attached to reproduction unit at all. Rather, at the appropriate time, cover 36 is simply laid over object 18 and reproduction surface 34. Moreover, as long as the requisite reflectivity is provided by cover 36 and cover 36 has sufficient size to cover object 18 and reproduction surface 34, cover 36 need not be resilient but can be cloth-like or have other shape holding characteristics. Accordingly, cover 36 effectively blankets object 18 and reproduction surface 34 with reflective surface 42.

Although the present invention has been described with reference to preferred embodiments, workers skilled in the art will recognize that changes may be made in form and detail without departing from the spirit and scope of the invention.

What is claimed is:

1. A device for producing an image of a three-dimensional object comprising:
    an image reader having a reproduction surface for supporting a three-dimensional object; and
    a cover having a reflective surface and being removably supported on the reproduction surface of the image reader, the cover having first and second opposite side edges, and third and fourth opposite side edges, the cover being substantially equally flexible in a first dimension generally parallel to the first and second side edges and a second dimension generally parallel to the third and fourth side edges, such that with a three-dimensional object supported on the reproduction surface, the first, second, third and fourth side edges of the cover directly contact the reproduction surface of the image reader due solely to the flexibility of the cover in the first and second dimensions.

2. The device of claim 1 wherein the cover is made of a generally resilient material.

3. The device of claim 1 wherein the reflective surface reflects light in a random pattern.

4. The device of claim 1 wherein the reflective surface is made of a highly glossy material.

5. The device of claim 1 wherein the reflective surface is made of material having a selected color that corresponds to a heightened sensitivity of the image reader.

6. The device of claim 1 where in the reflective surface of the cover has a surface area substantially larger than the reproduction surface of the image reader.

7. The device of claim 1 wherein the reflective surface is a textured, reflective coating.

8. The device of claim 1 wherein the image reader further comprises a flat bed-type scanner.

9. The device of claim 1 wherein the image reader further comprises a copier.

10. The device of claim 1 wherein the cover is opaque.

11. A method of reproducing an image of a three-dimensional object comprising:

supporting the three dimensional object on a reproduction surface;

blanketing the object and the reproduction surface with a cover having a reflective surface, the cover having first and second opposite side edges, and third and fourth opposite side edges, the cover being substantially equally flexible in a first dimension generally parallel to the first and second side edges and a second dimension generally parallel to the third and fourth side edges, such that with a three-dimensional object supported on the reproduction surface, the first, second, third and fourth side edges of the cover substantially directly contact the reproduction surface of the image reader due solely to the flexibility of the cover in the first and second dimensions; and illuminating the three dimensional object under the cover while reading an image of the object through the reproduction surface.

12. The method of claim 11 wherein the illuminating step further comprises:

reflecting light from the reflective surface of the cover back onto the object and back to the reproduction surface.

13. The method of claim 12 wherein the reflecting light step further comprises:

reflecting light in a random pattern from the reflective surface of the cover back onto the object and back to the reproduction surface.

14. The method of claim 11 wherein the blanketing step further comprises:

minimizing a distance between the object and the cover.

15. The method of claim 14 wherein the blanketing step further comprises:

minimizing a distance between the cover and the reproduction surface.

16. The method of claim 11 wherein the illuminating step further comprises:

illuminating the object through the reproduction surface with a light source disposed on an opposite side of the reproduction surface relative to the object and without a light source disposed between the cover and the reproduction surface.

17. The method of claim 11 wherein reading an image during the illuminating step further comprises scanning the image on a flat bed-type scanner.

18. A method of scanning an image of a three-dimensional object comprising:

supporting the three-dimensional object on a scanning surface;

draping a flexible cover having a reflective textured coating over the object;

illuminating the three-dimensional object with light sent through the scanning surface onto the object and onto the reflective textured coating of the cover such that light is reflected in a random pattern from the reflective textured coating of the cover onto the object and onto the scanning surface; and scanning an image of the object during the illuminating step.

19. A reflectance device for use with an image reproduction machine, the device comprising:

a generally flexible sheet; and a highly reflective textured coating on one side of the sheet for reflecting light emitted from the image reproduction machine in a random pattern.

20. The device of claim 19 wherein the sheet and the reflective textured coating have a surface area generally larger than a surface area of a reproduction surface of the image reproduction machine.

* * * * *